[11] 3,921,045
[45] Nov. 18, 1975

[54] DAMPED TORSIONAL ROD OSCILLATOR

[75] Inventors: Stanley Reich, Jericho; John C. Murray, Kings Park, Long Island, both of N.Y.

[73] Assignee: Bulova Watch Company, Inc., New York, N.Y.

[22] Filed: July 24, 1974

[21] Appl. No.: 491,398

[52] U.S. Cl. .................... 318/127; 310/36; 310/25; 350/6
[51] Int. Cl.² ........................................ H02K 33/12
[58] Field of Search ............... 350/6; 310/25, 36–39; 318/127, 128, 132; 84/457, 409; 58/23 TF, 23 D; 331/116, 116 M, 156; 333/71; 178/7.6

[56] References Cited
UNITED STATES PATENTS

| | | | |
|---|---|---|---|
| 2,815,477 | 12/1957 | Dunn et al. | 310/36 X |
| 3,080,538 | 3/1963 | Johnson | 333/71 |
| 3,513,415 | 5/1970 | Dostal | 310/25 X |
| 3,532,408 | 10/1970 | Dostal | 350/6 UX |
| 3,535,563 | 10/1970 | Mooney et al. | 310/25 |
| 3,609,485 | 9/1971 | Dostal | 318/132 |
| 3,642,344 | 2/1972 | Corker | 310/36 X |
| 3,666,974 | 5/1972 | Dostal | 58/23 TF X |

FOREIGN PATENTS OR APPLICATIONS 744,786   2/1956   United Kingdom ................... 310/36

*Primary Examiner*—Donovan F. Duggan

[57] ABSTRACT

A mechanical oscillator for periodically swinging an optical or other load element. The oscillator includes an erect torsion rod anchored to a base, the load element being attached to the free end of the rod. The rod is sustained in torsional vibration by a motor constituted by an armature secured to the rod at a point adjacent the base and an electromagnet cooperating with the armature, the motor being energized by a drive signal whose frequency substantially corresponds to the resonant frequency of the oscillator. In order to dampen the oscillator and thereby broaden its mechanical bandwidth, the rod is designed so that the spring constant of the section thereof above the armature point approaches that of the rod section below this point.

6 Claims, 7 Drawing Figures

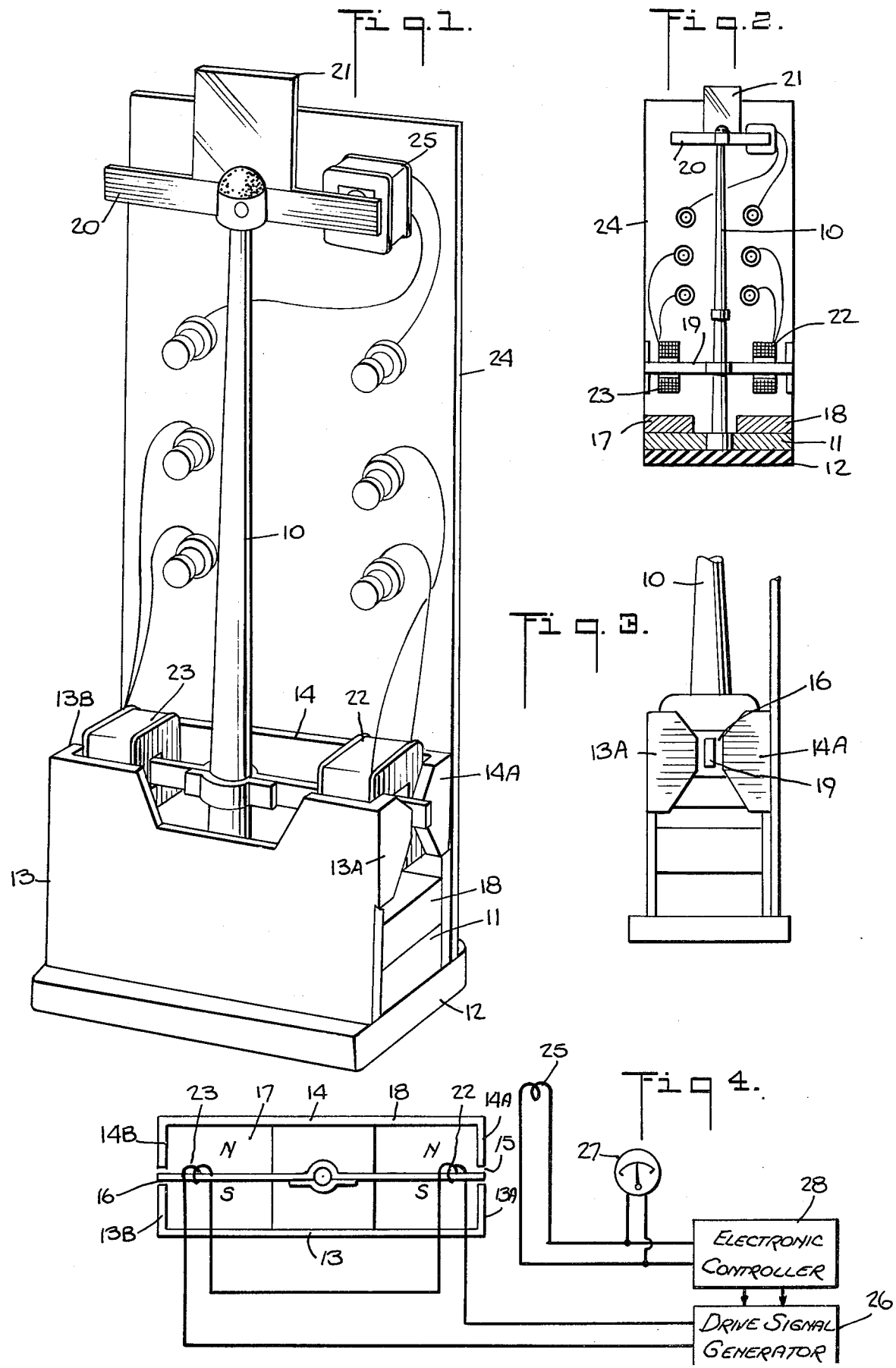

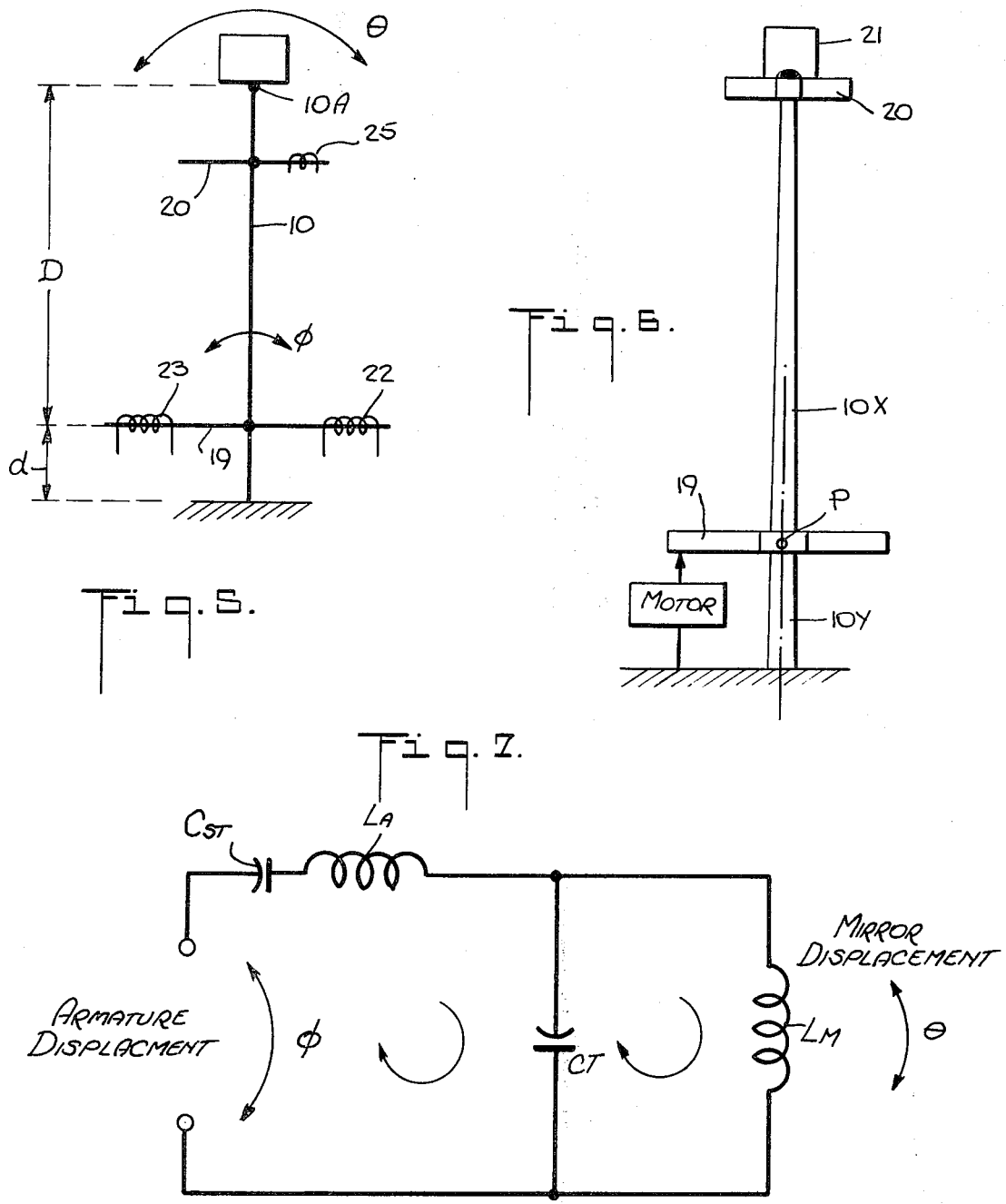

DAMPED TORSIONAL ROD OSCILLATOR

BACKGROUND OF THE INVENTION

This invention relates generally to torsional oscillators adapted to produce a vibratory motion of high amplitude, and more particularly to a torsional optical scanner having a relatively broad mechanical bandwidth.

Various forms of optical devices are currently in use to chop, scan, sweep or otherwise deflect or modulate a light or other beam of radiant energy. Such optical devices are incorporated in mass spectometers, bolometers, colorimeters, horizon sensors and in various instruments which utilize or analyze nuclear, X-ray or laser beams, or beams in the visible, ultraviolet or infrared region. In recent years, the need has arisen for optical scanners adapted to sweep a light beam across binary-coded bars or similar indicia to produce signal pulses for carrying out various computerized functions.

Existing optical devices for these purposes usually make use of motor-driven discs, drums, mirrors or prisms that are relatively cumbersome and have large power requirements. Also in use is an electromechanically-actuated armature device in which a pivoted armature carrying an optical element is mounted in jewel bearings. Such optical modulators are relatively inefficient and unstable and also lack shock resistance.

The drawbacks characteristic of existing mechanical oscillators are overcome in the resonant torsional oscillator disclosed in the patent to Dostal (U.S. Pat. No. 3,609,485) wherein an erect torsional rod, anchored at its base, is electromagnetically- driven at a point adjacent the base to cause an optical element secured to the free end of the rod to swing back and forth at a rate determined by the resonance frequency of the oscillator.

Inasmuch as the ratio of the angular swing at the free end of the rod with respect to the angular swing at the drive point depends on the distance between the drive point and the free end of the rod relative to the shorter distance between the drive point and the base of the rod, the deflection of the optical element at the free end is greatly amplified.

With an arrangement of the Dostal type, certain practical difficulties are experienced when the drive pulses for actuating the rod are derived from an external power source. In the case where the repetition rate of the power source signal is highly stable and corresponds to the natural resonance frequency of the torsion rod, the resultant amplitude of the swing at the free end of the rod is normally high, but is adversely affected by changes in ambient temperature which alter the resonance frequency of the rod.

A torsion rod is a mechanical resonator whose natural frequency is determined by its dimensions and Young's modulus of elasticity. The mechanical bandwidth or response-curve of a torsion rod depends on its Q or quality factor, the higher the Q, the narrower or sharper its bandwidth. That is to say, when a torsion rod oscillator has a high Q, it responds efficiently to drive pulses whose repetition rate exactly corresponds to its natural frequency. However the response drops sharply as the natural frequency deviates from the frequency of the drive pulses or as the frequency of the drive pulses deviates from the natural frequency of the oscillator.

If therefore we have a stable source of drive pulses and the natural frequency of the high-Q mechanical oscillator is caused to depart from its assigned value by reason of temperature changes affecting the torsion rod dimensions, then the amplitude of rod oscillations will markedly decrease. On the other hand should the source of drive pulses be unregulated, as a consequence of which the repetition rate deviates somewhat from the assigned oscillator frequency, then the amplitude of rod vibrations will decrease sharply to an extent determined by the degree of deviation.

Hence while a highly selective torsion rod oscillator of the type disclosed in the Dostal patent affords increased angular sensitivity, when this oscillator is driven from an external power source whose frequency is subject to variation or when the mechanical oscillator frequency is subject to change as a result of temperature changes, the oscillator in either case does not function efficiently.

SUMMARY OF THE INVENTION

In view of the foregoing, it is the main object of this invention to provide a relatively low-Q torsion rod oscillator having a broad mechanical bandwidth, whereby the frequency selectivity of the oscillator with respect to a drive signal is reduced and the oscillator functions efficiently even when the frequency of the drive signal deviates from the natural frequency of the mechanical oscillator.

Also an object of the invention is to provide a damped torsion rod oscillator which is adapted to swing an optical element or any other element acting as an inertial load over a limited angular range, the angular amplitude of the load accurately following rapid excursions in the amplitude of the drive signal.

A salient feature of the invention is that because of its reduced frequency selectivity, the oscillator may be driven from a non-precision signal source whereby the amplitude of mechanical oscillation is maintained despite deviations of the drive signal frequency from an assigned value. And in those instances where the drive signal source is highly stable but the natural resonance frequency of the oscillator deviates from its assigned value by reason of temperature changes, the amplitude of the mechanical oscillation is nevertheless maintained. Thus the low-Q torsion rod oscillator is capable of reliable operation under circumstances where a high-Q oscillator would fail.

Also an object of the invention is to provide a compact torsion rod oscillator which is relatively insensitive to shock forces and has a prolonged operating life. An oscillator in accordance with the invention exhibits virtually no operating wear and requires no lubrication or other care. While the oscillator will be described in an embodiment in which it functions as an optical scanner wherein an optical element is subjected to a high-amplitude vibratory action at a constant rate, it is to be understood that it is also useful in many other practical applications.

Still another object of the invention is to provide a torsion rod oscillator which is driven from an external power source and which generates a control signal as a function of the amplitude of oscillation, the control signal serving to regulate the power source to maintain a substantially constant oscillation amplitude.

Briefly stated, these objects are attained in a torsional oscillator having an erect torsion rod anchored to a base, an optical or other load element being attached to the free end of the rod and being caused to swing in response to the torsional movement of the rod.

The rod is sustained in torsional vibration by means of a motor provided with an armature secured to the rod at a point adjacent to the base and an electromagnet cooperating therewith. The motor is energized by a drive signal generator whose frequency substantially corresponds to the natural frequency of the oscillator. In order to dampen the oscillator, the rod is designed so that the section thereof above the armature point has a spring constant which approaches that of the rod section below this point. And in order to stabilize the mechanical amplitude of oscillation, a control signal is derived from the rod as a function of its amplitude, the control signal being applied to the drive signal generator and acting to regulate the amplitude of the drive signal.

OUTLINE OF THE DRAWING

For a better understanding of the invention as well as other objects and further features thereof, reference is made to the following detailed description to be read in conjunction with the accompanying drawing, wherein:

FIG. 1 is a perspective view of one preferred embodiment of a torsional oscillator in accordance with the invention, the oscillator operating as a light scanner;

FIG. 2 is a sectional view of the light scanner;

FIG. 3 is a side view of the light scanner;

FIG. 4 schematically shows the magnetic and electronic circuit arrangement of the oscillator;

FIG. 5 schematically illustrates how the swing of the torsional rod is amplified;

FIG. 6 schematically illustrates how the torsion rod is damped; and

FIG. 7 is an equivalent electrical circuit explanatory of the rod damping action.

DESCRIPTION OF THE INVENTION

Oscillator Structure

Referring now to the drawings, and more particularly to FIGS. 1 to 4, there is shown a torsional oscillator in accordance with the invention, the oscillator being adapted to function as an optical chopper to modulate, pulse, scan, sweep or otherwise control a beam of radiant energy impinging on the optical element being vibrated by the oscillator.

The oscillator comprises an erect torsion rod 10 whose lower end is anchored in a metal base plate 11 which in turn rests on an insulating mounting plate 12. Secured to the long sides of the base plate are a pair of upright frame elements 13 and 14 made of material such as iron having soft magnetic properties. The ends of these elements are provided with bent-in tabs 13A, 13B, 14A and 14B, which act as pole pieces and define magnetic air gaps. Only one gap (15) is visible in FIG. 1, the other gap 16 being shown in FIG. 3.

Nesting between frame elements 13 and 14 and lying adjacent the air gaps are a pair of permanent magnet slabs 17 and 18. The ends of these slabs making contact with the frame elements and thereby polarizing the tabs in the manner shown in FIG. 4. Thus tabs 13A and 13B are magnetically South and North respectively, as are tabs 14A and 14B, to provide lines of magnetic flux extending across the gaps 15 and 16.

Mounted transversely on rod 10 and symmetrically positioned thereon is a soft-iron drive armature 19, the opposite ends of the armature being disposed within air gaps 15 and 16. The armature is attached at a point adjacent the base of the rod. Similarly mounted on masthead 10A at the free end of rod 10 is a second and shorter armature 20, this armature being in the same vertical plane as the lower armature.

Mounted above masthead 10 is a reflecting mirror 21 which when rod 10 undergoes torsional movement is caused to rotate back and forth about the longitudinal axis of the rod, thereby periodically deflecting a light beam or other beam of radiant energy incident thereto at a rate determined by the resonance characteristics of the oscillator to provide a scanning or chopping action. The nature of the optical element forms no part of the present invention.

Encircling one end of armature 19 is a first stationary drive coil 22 which is cemented or otherwise attached to tabs 13A and 14A, and encircling the other end of the armature 19 is a second drive coil 23 attached to tabs 13B and 14B. Mounted on a backboard 24 near the upper edge thereof is a pickup electromagnet 25. This electromagnet cooperates with one end of the upper armature 20, the electromagnet consisting of a coil surrounding a magnetic core. Thus as armature 20 vibrates, a voltage is induced in electromagnet 25. The drive armature 19 in conjunction with drive coils 22 and 23 constitutes the motor of the oscillator.

Operation of Oscillator

The operation of the oscillator can best be understood in connection with FIG. 4 where it will be seen that drive coils 22 and 23 of the motor are connected to an external power generator 26 which supplies a drive signal whose frequency substantially corresponds to the natural operating frequency of the oscillator.

In the above-identified Dostal patent, the drive generator takes the form of an electronic amplifier whose input is connected to pick up coil 25 and whose output is connected to drive coils 22 and 23 to form a positive feedback or regenerative circuit producing power at a frequency determined by the mechanical resonance frequency of the torsional oscillator.

Hence should the mechanical resonance frequency of the Dostal oscillator change, the frequency of the power produced by the regenerative circuit changes accordingly and the amplitude of oscillation is maintained.

But in many practical applications, the Dostal feedback arrangement is not appropriate, as for example where the torsion rod scanner is associated with a computer system some of whose functions are controlled by a clock producing pulses at a predetermined repetition rate, the scanner acting to deflect a light beam to read binary-code bars to produce a computer input. In this instance, in order to synchronize the operation of the scanner with the computer it is necessary to drive the scanner externally with a drive signal produced by a generator under the control of the clock. Consequently the problems mentioned in the background section may arise because of a disparity between the operating frequency of the oscillator and frequency of the drive signal. The drive signal may, in practice, be in sinusoidal, square wave or pulsatory form.

But before considering how these problems are obviated by lowering the Q of the torsional oscillator, we shall first explain how the drive signal actuates the oscillator. In FIG. 4 it will be seen that magnetic pole pieces formed by tabs 13A and 14A and by tabs 13B and 14B are polarized by the permanent magnets 17 and 18 so that tabs 13A and 13B are both "South" wherein tabs 14A and 14B are both "North."

Assuming now that a drive pulse applied to coils 22 and 23 is positive-going, then the motor armature 19 becomes polarized so that the end thereof in air gap 15 is South and the other end in air gap 16 is North. As a consequence, in gap 15 the armature end is attracted to the North side while in gap 16 the opposite armature end is attracted to the South side, thereby imparting a clockwise torque to torsion rod 10 at the armature point. If on the other hand, the drive pulse is negative-going, the resultant force would be counterclockwise; but in either event, the rod is subjected to a torsional force.

The natural resonance frequency of the oscillator is determined by the moments of motor armature 19 and masthead armature 20 and that of reflector 21 as well as by the physical parameters and Young's modules of the torsion rod 10. To minimize the effect of temperature on rod dimensions, the rod may be fabricated of an alloy such as Ni-Span C or Elinvar whose elasticity and length are substantially unaffected by changes in temperature within a broad range. However in some instances because of the excessive stiffness characteristic of many metals having a zero-temperature coefficient, it may be necessary to use such alloys as beryllium-copper which have a greater sensitivity to temperature, in which case the operating frequency of the oscillator will be influenced by changes in ambient temperature.

The torsional movement of the rod at its resonance frequency causes the masthead armature to swing at the same rate and to induce a signal voltage in pick-up coil 25. The frequency of this voltage corresponds to the vibratory rate of the rod and the amplitude thereof is proportional to the amplitude of mirror deflection. In practice, this signal may be produced by a pair of pick-up coils on opposite sides of the masthead armature and connected in series. This signal voltage may be indicated by meter 27, and it may also be used as a control signal to govern the operation of external generator 26 by means of an electronic controller 28.

Controller 28 acts in response to the control signal from pick-up coil 25 to vary the amplitude of the generator output so as to maintain a constant oscillator amplitude. Thus in the controller, the control signal voltage from coil 25 is compared with a set point or reference voltage to produce an error signal which depends on the degree and direction of deviation of the oscillator amplitude from a reference level, the error signal being applied to the generator in a manner tending to null the error signal and thereby maintain the desired amplitude level.

It is not essential that two drive coils be used, and in a low-cost version of the oscillator, one may use a single armature 19, with a single drive coil at one end and a pick up coil at the other. This is not as efficient as the embodiment disclosed herein, but may be adequate in some applications.

Swing Amplification

In order to obtain a large swing of the mirror, it is essential that the torsional swing at the masthead be large. If the driving force were applied to an armature adjacent the masthead, it would be necessary to have a relatively large air gap to allow for the movement of the armature. But a large air gap would not provide a high magnetic flux density and this arrangement would be inefficient and even impossible.

In the present arrangement, driving armature 19 is adjacent the base of the rod and operates within relatively narrow gaps providing a high flux density. The displacement of the drive armature is relatively small, yet the swing of the masthead is quite large because of the mechanical amplification inherent in the structure.

As shown in FIG. 5, value ($d$) represents the short distance between the point of attachment of drive armature 19 and the base, and value ($D$), the long distance between this point and masthead 10A. The angle $\phi$ represents the angular swing of the rod at the armature position and the angle $\theta$, the angular swing of the masthead. Since $\phi/\theta = D/d$, it will be evident the larger or greater the difference between $d$ and $D$, the larger the angle of $\theta$ as compared to angle $\phi$. Hence by placing the armature 19 near the base, it becomes possible to drive the rod with a relatively small swing and yet obtain the desired large swing of the mirror on the masthead.

Higher frequencies are obtained by exciting a higher mode in the torsion rod. In this higher mode, a node develops in the middle region of the rod, and the pickup armature operates out of phase with the drive armature. Typical mirror displacements are 10° peak to peak at 2,000 Hz, and 3° at 10,000 Hz.

Damping

As pointed out previously, it is desirable to reduce the Q of the torsional oscillator in order to broaden the mechanical bandwidth of the oscillator and to render it less frequency-selective. The desired reduction in Q is effected by damping torsion rod 10. This damping, as illustrated in FIG. 6, is accomplished by increasing the effective coupling between the tapered section 10X of the rod above the point of armature attachment and the straight section 10Y below this point. This increase in coupling is effected in a manner consistent with the other parameters of the oscillator.

Because of such coupling, some of the energy produced at the free end of the rod to which the mirror or load element is attached is conveyed through point P to the motor associated with the rod where it is damped by the absorbing effect of the magnetic field. The extent of damping is a function of the degree of coupling, the strength of the magnetic field and the geometry of the air gap.

The influence of such coupling on damping can be best understood by considering the torsion rod and its inertial mirror load as a two mesh or loop electrical circuit, as shown in FIG. 7. One mode is the resultant of the load inertia of the rod, as represented by Lm which is the equivalent inductance, and the spring constant of tapered rod section 10X as represented by $C_t$, the equivalent capacity. The other and higher frequency mode is constituted by the drive armature inertia represented by the equivalent inductance La the spring constant of the straight rod section 10Y, as represented by capacity $C_{st}$.

As known from Hooke's law, the tension in a torsion rod or any other type of spring is directly proportional to the displacement produced by a force applied thereto (providing the elastic limit of the torsion rod or spring has not been exceeded). The factor of proportionality between displacement and tension is known as the spring constant. The degree of coupling between sections 10X and 10Y of torsion rod 10 is controlled by the ratio of their spring constants. Maximum coupling is attained when the spring constants are the same.

As these spring constants whose electrical analogs are capacitors, approach each other in value, the coupling between the mirror load and drive armature is increased. This increase in coupling for any given rod frequency is accomplished by making the tapered section stiffer, that is by reducing the slope of this section, and by reducing the diameter of the straight section 10Y. This can be seen from the following relationship:

$$w^2 = \frac{w_1^2 + w_2^2}{2} \pm \frac{1}{2}\sqrt{(w_1^2 + w_2^2)^2 - 4(w_1^2 - w_2^2)w_h^2}$$

where
- $w$ = resultant frequency
- $w_1$ = angular frequency taper section
- $w_2$ = angular frequency straight section
- $w_h$ = coupling angular frequency As the coupling is increased, more energy from the mirror load is absorbed by the motor, thereby lowering the Q of the oscillator and enlarging its mechanical bandwidth. The force developed by the magnetic bias is optimized to afford maximum damping. This is attained by choosing the operating point of the magnetic circuit so that it operates at the maximum energy point of the bias magnets.

While there has been shown and described preferred embodiments in accordance with the invention, it will be appreciated that many changes and modifications may be made therein without, however, departing from the essential spirit thereof.

We claim:

1. A torsional oscillator adapted to be driven by a periodic signal derived from an external generator, said oscillator comprising:

A. an erect torsion rod anchored at its base, said rod having a natural resonance frequency subject to change, B. a load element mounted on the free end of the rod and swinging therewith, and C. a motor driving said rod to sustain it in oscillation, said motor including an armature secured to the rod at a point adjacent said base and an electromagnet associated with said armature to produce in response to said periodic drive signal a torque to excite said rod into oscillations at the natural resonance frequency thereof, the section of said rod below said point having a spring constant which closely approaches the spring constant of the section above said point to produce a coupling between said sections acting to dampen said oscillator and to broaden its mechanical bandwidth, whereby the oscillator continues to function efficiently should the periodicity of the signal deviate from the natural frequency of the rod or the natural frequency of the rod deviate from the frequency of the drive signal.

2. An oscillator as set forth in claim 1, wherein said load element is a scanning mirror.

3. An oscillator as set forth in claim 1, wherein the upper rod section is tapered and the lower rod section is straight.

4. An oscillator as set forth in claim 1, further including an armature attached adjacent the free end of said rod and cooperating with a pick-up coil to produce a control signal indicative of the amplitude of oscillation of said load element.

5. An oscillator as set forth in claim 1, wherein said rod is made of beryllium-copper alloy.

6. An oscillator as set forth in claim 4, wherein said drive signal is produced by an external generator whose amplitude is governed by said control signal.

* * * * *